TELEPHONE ANSWERING AND RECORDING DEVICE

Filed May 27, 1950

4 Sheets-Sheet 1

INVENTORS
H. R. VAN DEVENTER
J. S. SHIVELY
P. C. BAILEY
BY
Van Deventer & Shively,
ATTORNEYS Nov. 15, 1955 H. R. VAN DEVENTER ET AL 2,724,015

TELEPHONE ANSWERING AND RECORDING DEVICE

Filed May 27, 1950 4 Sheets-Sheet 2

INVENTORS
H. R. VAN DEVENTER
J. S. SHIVELY
P. C. BAILEY

BY Van Deventer & Shively

ATTORNEYS

INVENTORS
H. R. VAN DEVENTER
J. S. SHIVELY
P. C. BAILEY
BY Van Deventer & Shively
ATTORNEYS Nov. 15, 1955 H. R. VAN DEVENTER ET AL 2,724,015

TELEPHONE ANSWERING AND RECORDING DEVICE

Filed May 27, 1950 4 Sheets-Sheet 4

INVENTORS
H. R. VAN DEVENTER
J. S. SHIVELY
P. C. BAILEY
BY
VanDeventer & Shively
ATTORNEYS United States Patent Office 2,724,015

Patented Nov. 15, 1955

2,724,015

TELEPHONE ANSWERING AND RECORDING DEVICE

Harry R. Van Deventer and John J. Shively, New York, N. Y., and Paul C. Bailey, Warminster, Pa., assignors, by direct and mesne assignments, to Telephone Answering and Recording Corporation, New York, N. Y., a corporation of Delaware Application May 27, 1950, Serial No. 164,734

28 Claims. (Cl. 179—6)

This invention relates to telephone answering devices which may also be used to record messages received over a telephone line circuit and is of the type using records which may be of any desired type.

A record may be made, hereinafter termed a "talkout message" and will be delivered to the calling party via the telephone line. Then, if desired, the calling party may speak and the incoming speech will be recorded on another record, which the user of the device can play back at will.

A recording device to be used in conjunction with a telephone circuit for the purpose of answering said telephone and recording the received message in the absence of persons in its vicinity, should have many features not common to ordinary recording and playback devices. Said features, to be described, relate not only to the mechanical efficiency of the apparatus, but also to the simplifying of its operation and to the safety of the operator, the apparatus and its appurtenances, keeping in mind the fact that the device will be used principally by persons mechanically and electrically unskilled.

It is further desirable that, despite the compact form the device must assume, repairs, when necessary, be readily accomplished without the necessity of removing the instrument from its installed location or completely disassembling the apparatus to replace a part.

Objects of the invention are:

To provide a telephone answering device wherein a single turntable is used for both the talkout record and the message-taking record, said talkout record to be recorded either on the inner extremity of the large record or on a separate record which may be placed directly over said large record.

To provide a telephone answering device wherein a talkout message of any length up to the full capacity of the large record may be recorded, and means whereby the function of the device may be simply that of answering incoming calls without taking an answer thereto.

To furnish a telephone answering device with a minimum of manual adjustments wherein, when it is desired to record, the act of placing the recorder and recording arm on its associated record starts the turntable and sets up the electrical circuits for recording, and when it is desired to play back a message already recorded, the act of placing the playback reproducer and its arm in position upon said message again starts the turntable and sets up the circuits for playback. When it is desired to use the machine to answer incoming calls, the act of placing both arms in their respective positions on the turntable sets up the electrical circuits for answering, so that the machine may be said to be almost fully automatic.

To provide a telephone answering device wherein, after the talkout message has been delivered, the shift of circuits from playout to record-in—hereinafter termed the "mid-cycle shift"—is accomplished automatically by a relay tuned to the frequency of a tone signal which has been recorded on the record at the end of the talkout message and at the time said talkout message was made. The sensitivity of said relay is adjusted to respond only to the higher voltage level of the recorded tone signal so that it will not be operated by any possible signal of the same frequency at normal voice level as, for instance, during the playing out of the talkout message.

To provide a telephone answering device having a second playback arm and a second tuned relay so that the subscriber, in calling his own machine from an outside telephone, may, after listening to his talkout message, use a whistle or other simple tone generator to operate said second tuned relay which, in a manner presently to be described, immediately reverses the electrical circuits from record-in to playout, and simultaneously lowers said second playback arm to the record so that said subscriber may listen from an outside telephone to messages taken by his machine at its installed location.

To provide a telephone answering device, the amplifier components of which are mounted upon a separate chassis, said chassis being fitted with suitable plugs in such a manner as to engage oppositely mounted plugs in the main chassis of the machine so that, in the interest of rapid maintenance service, the amplifier and its associated electronic circuits may be withdrawn from the machine when trouble occurs in said circuits, and another plugged in in its place.

To provide novel means for lifting the recording element from the record during the talkout phase of the answering cycle.

For the sake of illustrating a preferred form of the invention, it is shown as applied to a disk record type of phonograph and the telephone is a standard common battery instrument connected to a manual or automatic exchange. Many of the features herein disclosed can be applied to other types of phonographs such as those employing wire or tape records and the disclosure here made is illustrative only and not limitative, the invention being as defined in the appended claims.

*General description*

Figure 1:
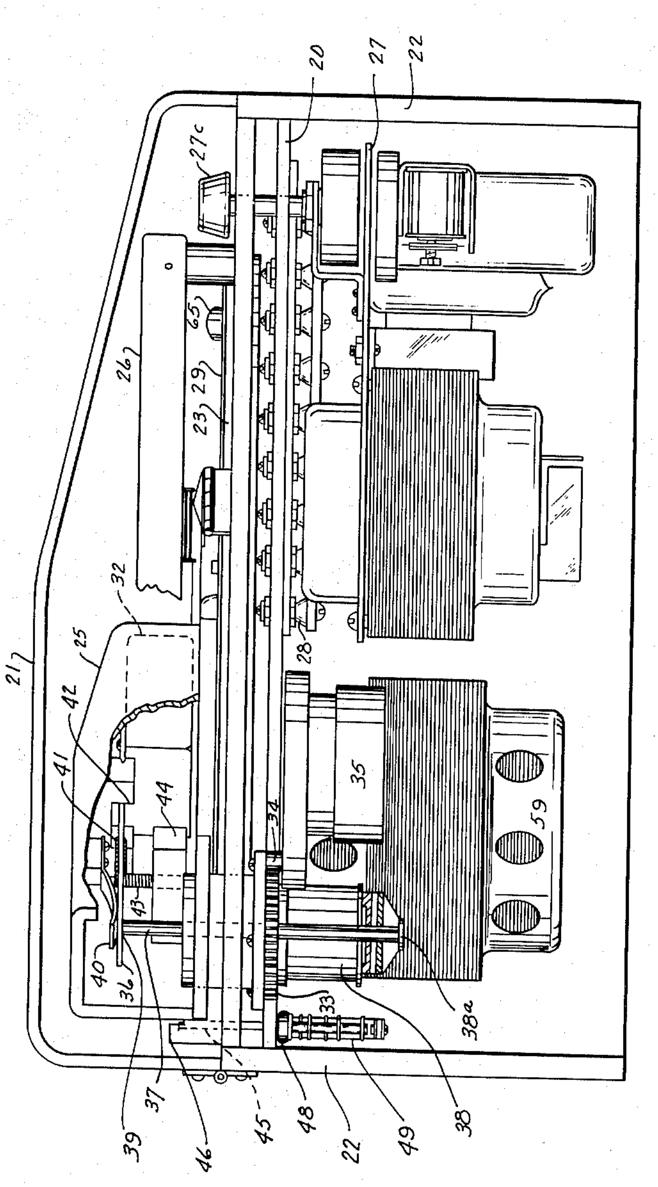
Figure 1 is a side view partly in section of a device embodying the invention.

Referring to Figure 1, the numeral 20 denotes the plate or chassis upon which the components of the machine are mounted. The top of the cabinet, which may assume any desired form, is shown at 21, while the four sides separately removable, are designated as 22. On the top of said chassis are mounted the turntable 23, a first playback arm 24, a recording arm 25, a second playback arm 26, and various controls, all presently to be described. Attached to the underside of the chassis are the various driving mechanisms also to be described. The amplifier 27 is mounted to the underside of the chassis by means of plugs 28 in such a manner that said amplifier may be removed without disconnecting any wires. The usual volume control 27c is provided for the amplifier 27.

In a telephone answering and recording device where a message is delivered to a calling party and said calling party is invited to leave a message which is to be recorded by the machine, there must occur, at the end of the talkout message, a shift of circuits from playout to record-in.

Heretofore, this mid-cycle shift has been effected mechanically as explained in previous patents and co-pending applications. In the present invention that shift of circuits is accomplished electronically by means of a tuned relay in the following manner:

A talkout message is made either on the outer edge of a record blank 29 or on a separate small record blank 65 in a manner hereinafter described. At the end of said message, a tone signal of suitable frequency is impressed upon said blank. Incorporated in the amplifier is a tuned relay 30 which, in a manner familiar to the art, is tuned to the frequency of the aforementioned tone signal; the frequency in this case was preferred in the 1400 cycle range so that the same oscillator might be used for both operating the tuned relay 30 and for generating the tone warning signal to be sounded while recording on the telephone line.

After the talkout message has been played out to the calling party, the recording of the tone frequency is expressed through the amplifier 27 in the output circuit of which is connected the tuned relay 30. As the relay 30 will energize only at this frequency, its contacts 30–A close, thus energizing the mid-cycle relay 31.

The mid-cycle relay serves the dual purpose of changing circuits and lifting the playback arm 24 from the record and returning it to its starting position. Applications Serial Nos. 30,538 filed June 2, 1948, now Patent 2,673,241 dated March 23, 1954, and 133,506 filed December 17, 1949, now Patent 2,713,088 dated July 12, 1955, may be referred to for the mechanical details of the arm lifting mechanism.

The operating mechanism for recording arm 25 has been described in the aforesaid co-pending application No. 30,538 and need not be described here except to note that the recording arm is driven through gears 33 and 34 by means of a motor 35 of suitable speed.

Figure 1 shows the means employed to raise and lower the recording element 32. A lever 36 is attached to the recording element 32 in such a manner as to extend back through the arm 25 so that its opposite extremity extends over a rod 37, the lower end of which is in contact with the armature 38*a* of an electromagnet 38. Near the outer end of the lever 36 is an opening 39 in such a position as to allow rod 37 to pass through said lever. Attached to the under side of arm 25 and extending over the opening 39 is a flat spring 40 which normally presses down on the end of lever 36 keeping the recording element 32 up off the record 29 or 65. Thus it will be seen that, when the electromagnet 38 is energized, its armature will move rod 37 upwards in such a manner as to release the pressure of spring 40 upon the end of lever 36 and so allow the recording element 32 to be lowered to the record.

A coil spring 41 is attached to the lever 36, part of said lever and block 42 forming the hinge upon which the recording element is pivoted. The opposite end of coil spring 41 is attached to a screw 43 mounted in a block 44 as a means of adjusting the tension of spring 41, a mounting well known in the art and requiring no further explanation.

Figure 2:
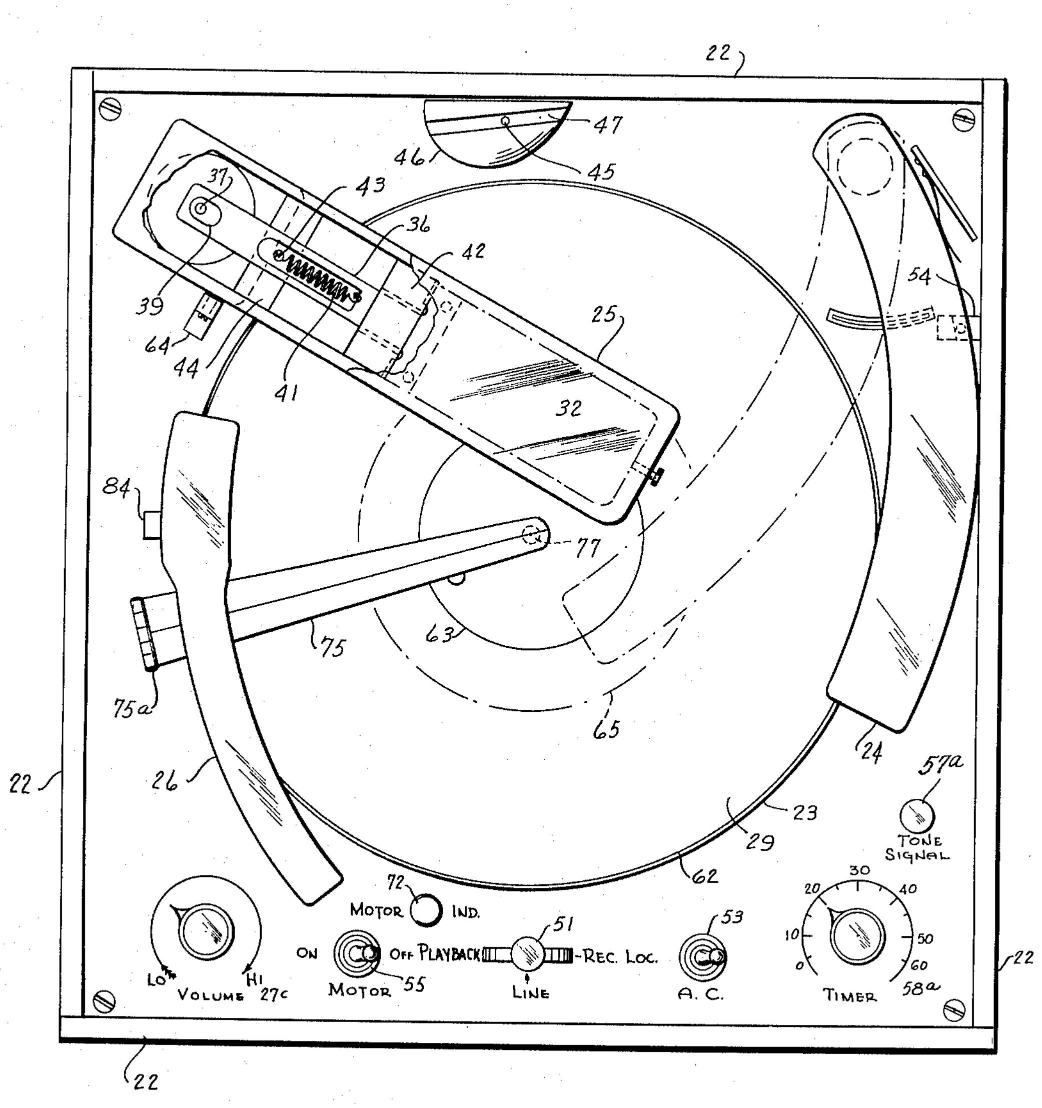
Figure 2 is a top view of the device shown in Fig. 1.

In Figures 1 and 2 is shown the details of a switch 49 which is operated by the recording arm for the purpose of setting the machine up for recording. The electrical functions of switch 49 will be described later. A rod 45 passes through the chassis 20 and the recording arm rest 46 and projects outwardly into the slot 47 of the rest. The rod 45 has an insulating pad 48 at its lower end, which rests on the upper contact of switch stack 49 so that, when the recording arm 25 is placed in its rest, the switch 49 is operated. A similar switch 50 is operated in a like manner by the playback arm 24.

A limit switch mechanism 49*a* similar to that described in the aforesaid copending application is used to prevent the machine from operating when the record has reached its full capacity. This switch is operated when arm 25 reaches the limit of its movement, whereupon the current supply is opened, as shown in Fig. 3.

*Recording locally, using the telephone transmitter as a microphone*

A three position key 51 on one of its positions connects the telephone line L1, L2 into the device; on another of its positions, said key sets up the electrical circuits for recording locally, disconnecting the telephone line and inserting a current supply in series with the telephone circuit 52 so that the transmitter of said telephone may be used as a microphone, independent of the telephone line. A third position is used for playing back the recorded messages.

Figure 3:
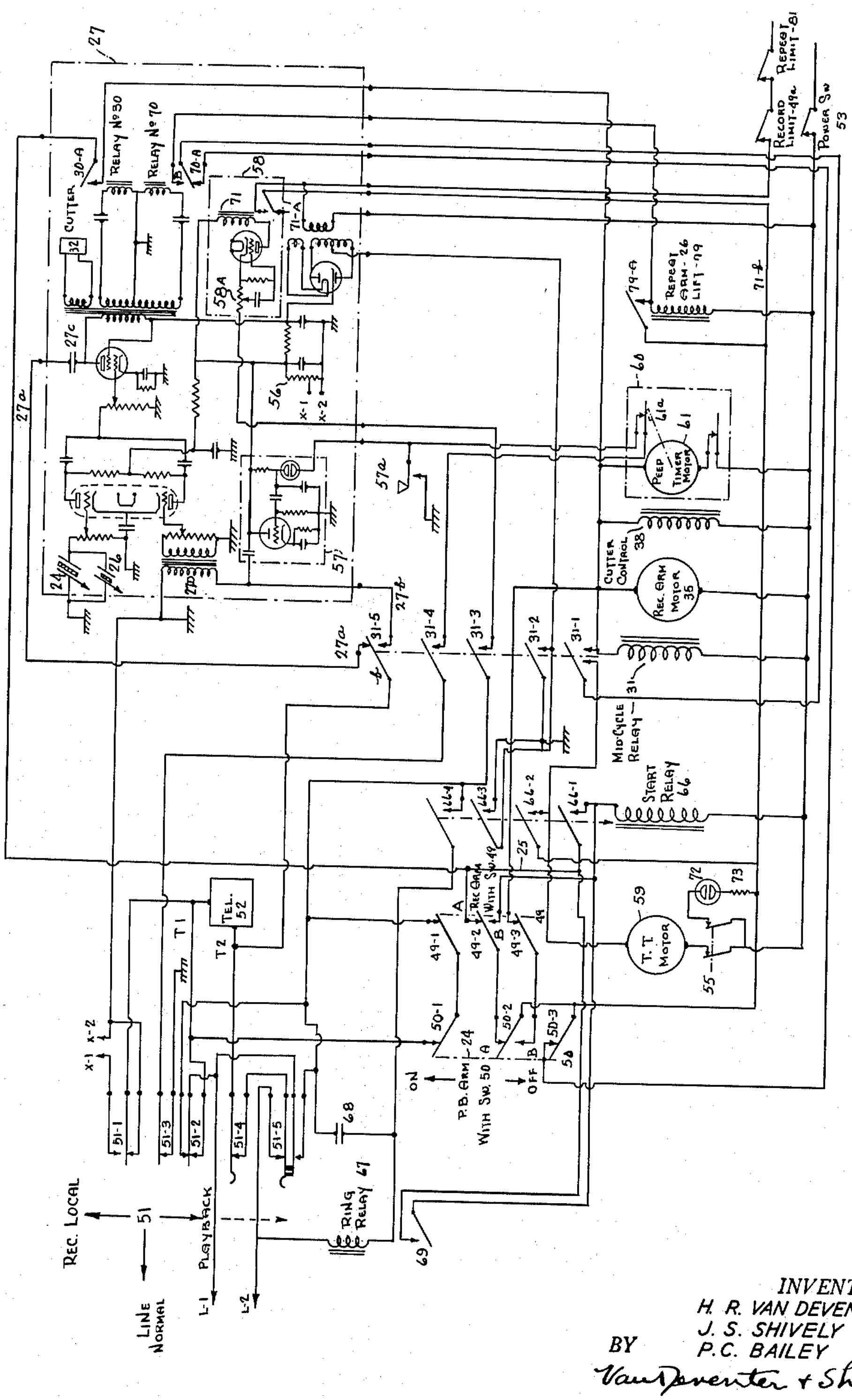
Figure 3 is a wiring diagram of the device shown in all the accompanying figures.

Figure 3 will show that in moving key 51 to its Record Local position, current derived from a tap X1, X2 on the resistor 56 in the amplifier power supply is inserted in series with the telephone 52 by means of contacts 51–1 on key 51. This supplies talking battery to the telephone transmitter so that same can be used as a microphone for recording speech on record 29 or 65. A second set of contacts 51–2 disconnects the L–1 side of the telephone line from the T–1 side of the telephone circuit and connects the ringing relay 67 and condenser 68 across the telephone line. A third set of contacts 51–3 opens the circuit to the tone signal generator 57 shown in Figure 3 as grouped with the amplifier. A fourth set of contacts 51–4 disconnects the L–2 side of the telephone line from the T–2 side of the telephone.

When recording locally the playback arm 24 is at Off position. In lifting the recording arm from its rest 46 to place said arm on the record, the aforementioned switch 49 is moved to On position as shown in Figure 3. The circuit may be traced in Fig. 3 as follows; on switch 49 a set of contacts 49–1 which control the electronic interval timer 58 are closed but, being in series with another set of contacts 50–1 on the playback arm switch 50 (said contacts being open at this time), the interval timer 58 is inoperative. It will be understood that the interval timer 58 operates to determine the duration of the recording period when recording incoming messages over the telephone line and not at other times.

A second set of contacts 49–2 on switch 49 function only on "answering" and will be explained under same.

A third set of contacts 49–3 on switch 49 obtain current from one side of the current supply line through the B side of contacts 50–2 on switch 50 to energize relay 31. In closing, relay 31 starts motor 59 through contacts 31–1, closes the negative side of the amplifier power supply through contacts 31–2, and connects the telephone 52 into the input of the amplifier 27 through contacts 31–5 so that speech expressed into the transmitter of said telephone will energize the recording element or cutter 32 which is connected to the output of the amplifier.

A timer 60, used to time the interval between the tone signal pulses, is driven by a motor 61. Said timer is fully described in the aforesaid copending application and need not be described in further detail here except to note that here a variable electronic timer 58 is substituted for the mechanical arrangement shown in said copending application.

Although motor 61 is energized while recording locally, and the contacts 61*a* are operated, the tone signal is inoperative when recording locally by reason of the tone signal circuit being open at contact 51–3 of key 51, which at this time is thrown to "Record Local."

Therefore, to use the device for recording locally, the A. C. supply switch 53 is closed, a record blank 29 or 65 is placed on the turntable, key 51 is moved to Record Local position and the recording arm 25 is placed in position on said record blank with the playback arm 24 in its rest 54. The motor switch 55 is closed, starting the turntable 23 and the telephone transmitter is used as a microphone to record on the record.

*To record the talkout record*

A suitable mechanism for locating the starting position of the recording arm 25 relative to the record blank has been described in detail in said copending application and will not be described here as this feature is not claimed herein. With the present invention it is preferred that the talkout message be started at the outer extremity 62 of the record and recorded toward the center thereof. However, by simply changing the direction of rotation of motor 35, the talkout message may be started at the inner extremity 63 of the record and recorded outwardly therefrom, in which case a stop 64 will serve to fix the starting point of the talkout message. The talkout message may also be recorded in either direction on a separate small blank 65 which may be placed directly over the large blank 29.

The key 51 is moved to Record Local position and the motor switch 55 is closed, starting motor 59 which rotates the turntable 23. The talkout message is spoken into the telephone transmitter and at the end of said message a push button switch 57*a* is manually operated which impresses a tone signal on the record, said tone signal being of greater intensity than the normal speech level. The purpose of this tone signal will be explained under Answer incoming calls. The talkout message should then be played back to check the correctness of the wording.

*Playing back recorded messages*

When key 51 is moved to playback position, a pair of contacts 51–5 disconnects the telephone line 12 from the telephone 52. Contacts 51–6 connect the relay 67 and condenser 68 across the telephone line. When the playback arm 24 is lifted from its rest and placed on the record, switch 50 is moved to On position. Two sets of contacts 50–1 and 50–3 of said switch function only on Answering incoming calls and will be explained under that heading. Contacts 50–2 energize the relay 66 through the A side of contacts 49–2 on switch 49, said switch being at Off position, due to the recording arm 25 being at rest off the record. The holding or locking circuit of relay 66 comprising contact 66–1 and necessary only on Answering, is broken at the B position of contacts 49–2, so that the relay will lock in only on Answering. In closing, relay 66, through contact 66–2, energizes the motor 59 which moves the turntable 23. Contacts 66–3 close the negative side of the amplifier power supply, thus energizing the amplifier.

Therefore when it is desired to play back messages already recorded, it is only necessary to place the recording arm 25 in its rest, which act disconnects its transverse driving mechanism (as described in the aforesaid copending application), and operates the switch 49 via plunger 45. The key 51 is thrown to playback position and the playback arm 24 is placed in position on the record 29 or 65. The motor switch 55 is closed, starting the motor 59 which revolves turntable 23, and the telephone receiver is used for listening to the message recorded on the record.

*To play back recorded messages over the telephone line*

The same sequence applies in this function as was described under the last heading with the exception that the key 51 is moved to "Line" position, in which the telephone and amplifier circuits are connected to the telephone line so that any speech introduced into the amplifier will be expressed into both the local telephone 52 and any telephone connected at the distant end of the telephone line L1, L2.

*Answering incoming calls*

Figure 3 shows the circuit as set up for automatic answering. The key 51 is moved to "Line" position and both arms 24 and 25 being on the record in their respective operating positions, switches 49, 50 are at "On" position, the power supply switch 53 and the motor switch 55 being closed. One side of the ringing relay 67 is connected permanently to the L–2 side of the telephone line, the other side of said relay being connected to its associated condenser 68, said condenser being connected through contacts 49–1 and 50–1 to the L–1 side of the telephone line so that, upon the application of ringing current to the telephone line, relay 67 will be energized, closing its contacts 69. Contacts 69, deriving current from one side of the current supply source through contacts 49–2 and 50–2, energize relay 66 which closes its contacts 66–4 to short circuit the ringing condenser 68, in this manner placing an impedance across the telephone line so as to operate the supervisory signal at the telephone exchange in a manner that will be obvious and which is explained in the aforesaid copending application. Contacts 66–3 close the negative side of the amplifier power supply, energizing the amplifier 27; contacts 66–2 energize the motor 59 and contacts 66–1 hold the relay 66 in energized condition.

The motor 59 moves the turntable, and the playback arm 24 having started the cycle on the record, traverses said record in a normal manner. At the end of the talkout message, the aforementioned tone signal impressed at the end of the recorded message by button 57*a* as previously disclosed, is expressed through the amplifier to operate the tuned relay 30 which closes its contacts 30–A and supplies current to the mid-cycle relay 31, which is held in energized condition by its contacts 31–1. It will be noted that the holding circuit of relay 31 is used only on Answering, said circuit obtaining its current through the On position of contacts 50–3 on switch 50 and through the normally closed side of contacts 70–A in relay 70, the function of which will presently be described.

Contacts 31–4 on relay 31 close the circuit to the tone signal generator 57 while contacts 31–3 close the circuit of the electronic timer 58. Contacts 31–5 in their normal position connect the output 27*a* of the amplifier 24 to the telephone line L2, the line circuit being capacity-coupled to the amplifier by condenser 27*c*.

When relay 31 is energized and the blade *b* of contacts 31–5 takes its opposite position, the telephone line is inductively connected to the input 27*b* of the amplifier so that any speech received on the telephone line will be expressed into the recording element 32 via the coil 27*d* which therefore inductively couples the recorder to the telephone line circuit. In closing, contacts 31–1 also energize the electromagnet 38 which lowers the recording element 32 to the record, and the tone signal timer motor 61 is started. At the end of the interval for which the electronic timer 58 has been set by timer control 58*a* in the usual manner, a relay 71 in the timer circuit opens its contacts 71–A, said contacts being in series with the current supply line 71*b* to all equipment. This automatically resets all circuits to normal, ready for the next call.

From the foregoing it will be seen that the sequence of operation is as follows:

1. Ringing relay 67 is energized by ringing current.
2. Relay 66 is energized.
3. Amplifier 27 is energized.
4. An impedance winding of relay 67 is placed across the telephone line to hold the supervisory relay or the equivalent automatic switch on dial systems.
5. Motor 59 moves the turntable 23 and the message on record is delivered to the calling party.
6. The tone signal at the end of the recording operates relay 30.
7. Relay 31 is energized.
8. Voice circuits switch from playout to record-in at 31–5.
9. Interval timer 58 is energized to permit recording for a predetermined period.
10. Recording element 32 is dropped to the record 29 and the calling party can record any message he wishes to leave.

11. Tone signal timer 60 is energized to deliver a warning signal from tone generator 57 that a recording is being made.

12. Relay 71 opens its contacts at the end of the recording period, resetting all circuits.

Therefore, when it is desired to use the machine for answering incoming calls, the current supply switch 53 is closed, the motor switch 55 is closed, switch 55 being of the double pole single throw type, one pole of which controls the motor 59 and the other pole of which operates a neon lamp 72 through its associated resistor 73, so that this neon lamp must be lit before leaving the machine. Both the recording arm 25 and the playback arm 24 are placed in their respective positions and the key 51 is moved to Line position.

*Message repeater to a subscriber calling from an outside telephone when no one is present to operate the instrument*

Figures 4, 5, 6:
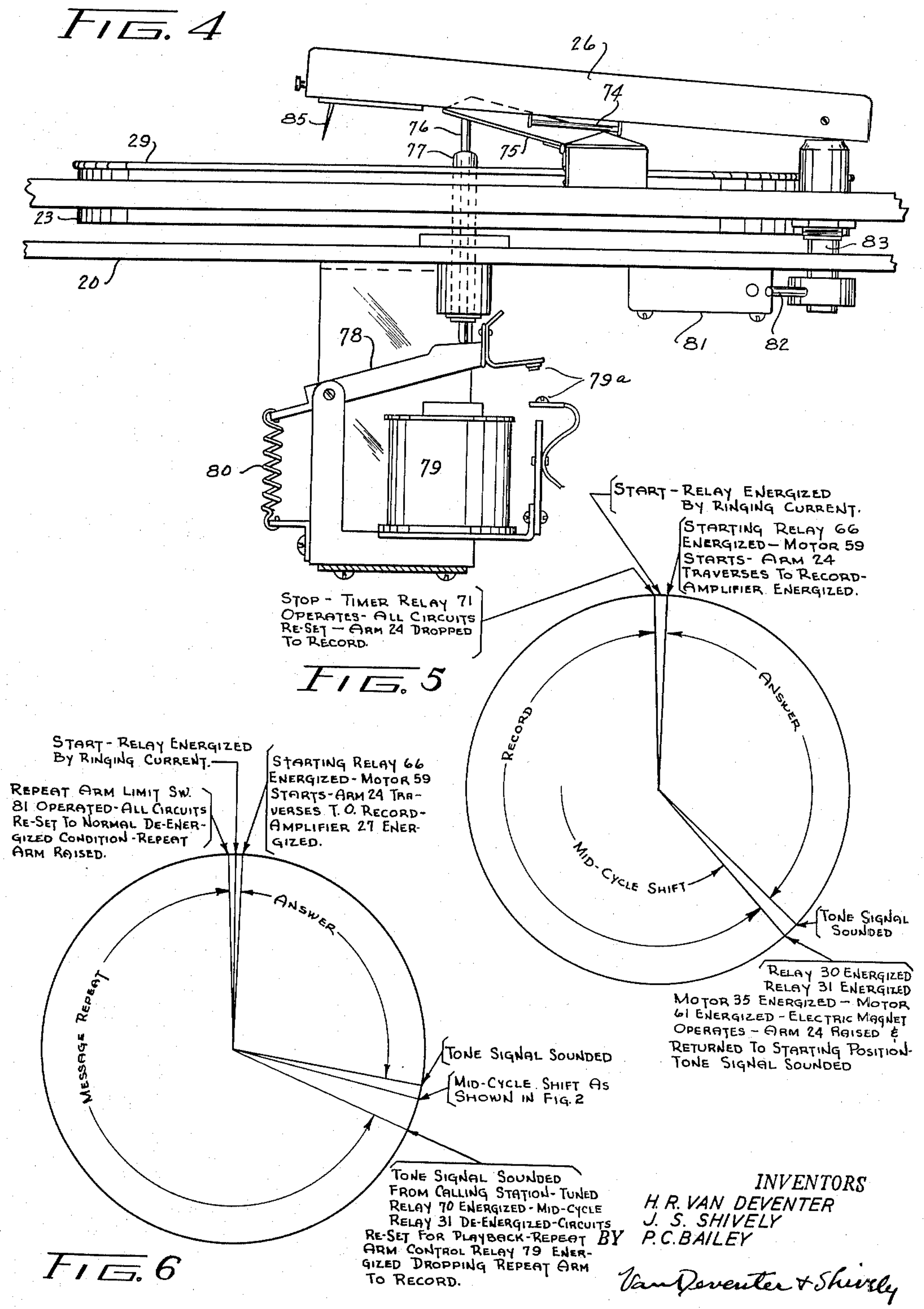
Figure 4 is a view of the answering reproducer, its arm and the operating magnet 74 therefor.
Figure 5 is a polar diagram illustrating the answering and recording cycle of the device.
Figure 6 is a polar diagram of the repeater or "message repeat over line" cycle of the device.

A repeater playback arm 26 is shown in Figures 1, 2 and 4 as having a roller 74 which in normal position rests upon a ridged horizontal lever 75 which is hinged to the chassis at its outer end 75*a*. The inner end of lever 75 rests upon a rod 76 which extends through the record center post 77 to the armature 78 of a relay 79. Normally relay 79 is de-energized so that its spring 80 holds the armature in raised position and, through rod 76, holds the lever 75 also in raised position so that the playback arm 26 is normally off the record. When relay 79 is energized, the playback arm 26 will be lowered to the record and traverse same in a normal manner. A switch 81 is operated by arm 82 which is fastened in the shaft 83. Switch 81 is positioned in such a manner as to be operated when the arm 26 reaches the inner extremity 63 of the recording record 29 at which position it de-energizes relay 79 in a manner presently to be described. In de-energizing, relay 79 lifts the lever 75, raising the playback arm 26 and forming an angle upon which said playback arm will swing on roller 74 back to its stop 84.

In calling from an outside station for a repeat of messages taken by the machine, the subscriber calls the number of the line to which the machine is connected and listens to his own Talkout message which proceeds in a manner already described. When the Talkout message is ended and the relay 31 has been energized connecting the telephone line into the input of the amplifier for recording as previously described, the subscriber uses a whistle or similar tone generator to sound a signal of a frequency identical to that to which the second tuned relay 70 has been tuned to respond.

In energizing, relay 70 opens its contacts 70–A which immediately resets the mid-cycle relay 31 changing the voice circuits from record-in to play-out and raises the recording element 32 from the record. Simultaneously relay 70 has closed its contact 70–B to energize relay 79 which lowers the second playback arm 26 to the record. Relay 79 is held in energized condition by its holding contact 79–A.

The second playback arm 26 has been positioned on the chassis in such a manner as to have the arc described by the line of travel of its needle 85 swung somewhat past the center post 77 so that, should the record be only partially used, the needle 85 will leave the last groove therein, and be pulled by the movement of the turntable towards the center of the record at which point the repeater limit switch 81 is opened, thus resetting all circuits to normal by momentarily opening the current supply line.

The instrument is then ready to answer an incoming call and to record any message the caller wishes to leave, as previously described.

What is claimed is:

1. In a device of the character described a communication circuit, a reproducing phonograph having a sound record containing a recording of speech followed by a recording of sound of definite pitch, a recording phonograph including a record blank, means connected to said circuit including a relay responsive to telephone ringing current to connect said reproducing phonograph thereto to deliver speech recorded on said first record, said means also including an amplifier connected to said circuit and to said reproducing phonograph, a second relay having a winding responsive to an electrical frequency corresponding to said sound of definite pitch connected to said amplifier to receive impulses produced by said recording of definite pitch on said sound record, and means controlled by said second relay whereby upon the operation thereof, said reproducing phonograph is disconnected from said communication circuit and said recording phonograph is connected thereto.

2. The combination as claimed in claim 1 wherein said recording phonograph has a motor serially included in circuit with a source of current which also supplies said amplifier and a timer connected to said last circuit and having contacts serially included in circuit with said last motor whereby said timer may be set to disconnect said motor after a predetermined period.

3. In a device of the class described, means included in said device and forming a part thereof for producing a sound of definite pitch, means for translating said sound into electrical impulses of a frequency corresponding to said pitch, a communication circuit, control means connected to said circuit for connecting said first means and second means thereto to transmit said sound thereover, a relay responsive to said electrical impulses connected to said second means, a recording phonograph and means controlled by said relay for connecting said phonograph to said circuit and a source of current separate from said means for producing a sound of definite pitch and of a different pitch therefrom for operating said phonograph.

4. The combination as claimed in claim 3 wherein said phonograph includes means for recording sound on the record of said phonograph, said last means having a non-operating position and where said means controlled by said relay also controls the movement of said means for recording sound to operating position.

5. In combination with a telephone line circuit, a ringing relay connected thereto, a reproducing phonograph, means controlled by said relay for connecting said reproducing phonograph to said line to deliver a recorded speech thereto, said means including an amplifier having an output circuit connected to said line circuit and an input circuit connected to a recorder, a tuned relay connected to said amplifier circuit, a recording phonograph, and means controlled by said relay for disconnecting said reproducing phonograph from said line circuit and connecting said recording phonograph thereto, said last means including a switch for disconnecting said line circuit from said output and connecting said input circuit thereto upon the operation of said tuned relay.

6. In a device of the character described, a telephone line circuit, a reproducing phonograph connected to said line circuit, including an amplifier having an input and output circuit said output circuit including the reproducer of said phonograph, said output circuit being serially connected to said line circuit via a condenser, a tuned relay inductively coupled to said output circuit, a recording phonograph including a record blank and controlled by said relay and having a recorder connected to the input circuit of said amplifier and control means including a second relay having contacts connected to said tuned relay whereby upon the actuation thereof, said output circuit is disconnected from said telephone line by some of said contacts of said second relay and said input circuit is connected to said telephone line whereby said recording phonograph may record speech received via said line.

7. The combination as claimed in claim 6 including means connected to said recorder to cause same to engage said record blank and wherein said tuned relay upon actuation operates said last means.

8. The combination as claimed in claim 6 including a timer serially included in a circuit with some of said contacts and adapted to disable said control means after a predetermined interval.

9. In a device of the character described, the combination with a telephone instrument having a transmitter and a recording phonograph connected thereto including a record blank, connecting means whereby said transmitter may be connected to said phonograph and used as a microphone to record sound on said record blank, means for recording a sound of definite pitch on said record, a reproducing phonograph and means for connecting same to said recording phonograph to receive and reproduce said sound record, a telephone line circuit, switch means connected to said reproducing phonograph and to said line to permit said last phonograph to play said record to said line to reproduce said record thereon, and control means including a relay responsive to electrical impulses corresponding in frequency to said sound of definite pitch connected to said line circuits and having circuits and contacts for disconnecting said reproducing phonograph from said line and connecting said recording phonograph thereto.

10. In combination with a telephone line circuit a relay connected thereto responsive to ringing current, a recording phonograph and means for physically connecting same to said line circuit controlled by said relay connected to said circuit to record speech thereover, means including a second relay connected to said circuit for operation by current flowing therein and reproducing means controlled by contacts in said last relay for repeating any message recorded by said phonograph and delivering said recorded message to said line cricuit for transmission thereover.

11. In combination with a telephone line circuit, a relay responsive to a first signalling current flowing in said circircuit, a reproducing phonograph controlled by said relay and connected thereby to said line circuit to deliver a message thereto, switch means controlled by the operation of said phonograph for disconnecting same from said line circuit and connecting a recording phonograph having a record and a recording element to record speech reaching said last phonograph via said line circuit, a second reproducing means including a movable reproducer element having a starting position relative to said record and adapted to reproduce said recorded speech and repeat same to said line circuit to be heard by a distant listener, and control means independent of said relay and operable by a second signalling current flowing in said line circuit for controlling the operation of said second reproducing means.

12. The combination claimed in claim 11 including an electromagnet for moving said second reproducer element into and out of engagement with said record.

13. The combination as claimed in claim 11 wherein said last means includes an electromagnet for moving said recording element into and out of engagement with said record.

14. The combination as claimed in claim 11 including means controlled by the operation of said control means to return said reproducer element to its starting position.

15. The combination as claimed in claim 11 wherein said last means includes a tuned relay responsive to said second signalling current and non-responsive to said first signalling current.

16. The combination as claimed in claim 11 wherein said last means includes a tuned relay, a transformer having a winding connected to said turned relay, and a common source of current for operating said phonograph and said transformer.

17. In combination with a telephone line circuit, a relay responsive to a first signalling current flowing in said circuit, a reproducing phonograph controlled by said relay and connected thereby to said line circuit to deliver a message thereto, switch means controlled by the operation of said phonograph for disconnecting same from said line circuit and connecting a recording phonograph having a record and a recording element thereto to record speech reaching said last phonograph via said line circuit, a second reproducing means including a movable reproducer element having a starting position relative to said record and adapted to reproduce said recorded speech and repeat same to said line circuit to be heard by a distant listener, a timer connected to said line circuit and adapted to periodically deliver tone signal thereto whereby a listener connected thereto will know said recording is in progress, and means independent of said relay and operable by a second signalling current flowing in said line circuit for controlling the operation of said second reproducing means.

18. In combination with a telephone line circuit, a relay responsive to a first signalling current flowing in said circuit, a reproducing phonograph controlled by said relay and connected thereby to said line circuit to deliver a message thereto, switch means controlled by the operation of said phonograph for disconnecting same from said line circuit and connecting a recording phonograph having a record and a recording element to record speech reaching said last phonograph via said line circuit, a second reproducing means including a movable reproducer element having a starting position relative to said record and adapted to reproduce said recorded speech and repeat same to said line circuit to be heard by a distant listener, a timer connected to said line circuit and adapted to periodically deliver a tone signal thereto whereby a listener connected thereto will know said recording is in progress, means independent of said relay and operable by a second signalling current flowing in said line circuit for controlling the operation of said second reproducing means and means for disconnecting said tone signal from said line circuit during the operation of said second reproducing means.

19. In combination with a telephone line circuit, a reproducing phonograph, means for connecting said phonograph to said line circuit operated by current flowing therein, switch means including a tuned relay controlled by the operation of said phonograph for disconnecting same from said line circuit, a recording phonograph including a record and a recording element and including means controlled by said switch means for connecting said last phonograph to said line circuit, means controlled by said switch means including a second tuned relay responsive to current flowing in said line circuit, and a reproducing element adapted to traverse said record and repeat sound recorded thereon to a listener on said line circuit controlled by said last means.

20. The combination as claimed in claim 19 wherein said last means includes an electromagnet for disabling said recording element during the operation of said reproducing element.

21. The combination as claimed in claim 19 wherein said recording element is vertically movable above said record and is normally held out of contact therewith and lowered thereto by the operation of said switch means and raised therefrom by an electromagnet controlled by said last means.

22. In combination with a telephone line circuit, a phonograph having a movable reproducer and a record adapted to be engaged by said reproducer, means for connecting said phonograph to said line circuit to deliver recorded speech thereto, switch means including a tuned relay adapted to be actuated by a recorded frequency on said record for controlling the connection of said phonograph to said line circuit and the relation of said reproducer to said record, a recording phonograph including a record and a recording element and including means controlled by said switch means for connecting said last phonograph to said line circuit, means controlled by said switch means including a second tuned relay responsive to current flowing in said line circuit, and a reproducing element adapted to traverse said record and repeat sound recorded thereon to a listener on said line circuit controlled by said last means.

23. In a device of the character described connected to a telephone line circuit for operation thereover, the combination of a phonograph including a record and a reproducer having a starting position relative to said record, a first switch means operable by current flowing in said circuit for starting said phonograph to reproduce speech recorded on said record and deliver said speech to said circuit, a second means including an electromagnet for returning said reproducer to its starting position upon termination of said recorded speech, said last means including a tuned relay responsive to a frequency recorded on said record, a record blank and a recorder adapted to record speech thereon received via said line circuit, said recorder having an off-record position during the playing of said recorded speech, a motor for moving said recorder, and means operated by said second means including an electromagnet for placing said recorder on said record blank and for starting said motor.

24. In a device of the character described, a cabinet; a chassis plate mounted in said cabinet; means for supporting a talk-out record and a second record upon which a recording of sound can be made, supported above said plate; means for moving said records located within said cabinet and projecting upwardly through said plate; a reproducer including an arm mounted on said device and swingable over said talk-out record to engage the same; a recorder mounted on said plate and adapted to cooperate with said second record to record sound thereon; an amplifier within said cabinet; means located below said chassis plate including a ringing relay, a starting relay, and switching means and circuits connecting said relays and switch means to said amplifier, reproducer and recorder whereby upon receipt of incoming ringing current over a telephone line circuit terminating in said cabinet said device will be, first, automatically and physically connected to said line circuit, and said amplifier will be connected to said reproducer to deliver to said line circuit speech recorded on said talk-out record, secondly, said means will connect said recorder to said amplifier to record speech on said second record incoming over said telephone line, thirdly, said means will restore all said circuits to normal condition awaiting a second call; and manually operable means carried by said cabinet and operable from outside the same for controlling the circuits and switches therein.

25. In a device of the character described, a cabinet; a chassis plate mounted in said cabinet; means for supporting a talk-out record and a second record upon which a recording of sound can be made, supported above said plate; means for moving said records located within said cabinet and projecting upwardly through said plate and adapted to revolve said first means; a reproducer including an arm mounted on said device and swingable over said talk-out record to engage the same; a second reproducer mounted on said device to engage said second record; a recorder mounted on said plate and adapted to cooperate with said second record to record sound thereon; an amplifier within said cabinet; means located below said chassis plate including a ringing relay, a starting relay, and switching means and circuits connecting said relays and switch means and to said amplifier said reproducers and recorder whereby upon receipt of incoming ringing current over a telephone line circuit terminating in said cabinet said device will be, first, automatically and physically connected to said line circuit, and said amplifier will be connected to said first reproducer to deliver to said line circuit speech recorded on said talk-out record; secondly, said means will connect said recorder to said amplifier to record speech on said record incoming over said telephone line; thirdly, said means will restore all said circuits to normal condition; fourthly, upon receipt of incoming ringing current differing in frequency from said first mentioned ringing current, said second reproducer will be connected to said amplifier to deliver to said line circuit speech recorded on said second record; fifthly, said means will restore all circuits to normal condition awaiting subsequent calls; and manually operable means carried by said cabinet and operable from outside the same for controlling the circuits and switches therein.

26. In a device of the character described, a ringing relay having normally open contacts and a winding, the latter adapted to be connected to a telephone line circuit for operation thereover by incoming current; a source of current; a driving motor; a phonograph connected to said motor to be driven thereby; a record in said phonograph having thereon a speech recording followed by a tone signal recording; translating means adapted to translate said recording into electrical impulses; means including said source of current and said ringing relay contacts for starting said motor; means for recording sound on a record; and means operated by said tone signal impulses for starting the operation of said recording means.

27. The combination as claimed in claim 26 wherein said means for recording sound on a record includes an amplifier having its input circuit connected to said translating means and its output circuit connected to said means operated by said tone signal.

28. In an electrically operated telephone answering device, means to perform a plurality of related functions including automatic answering and incoming message recording over a connected telephone line, said means including: a phonograph having a record containing a recorded message followed by a tone signal recording; translating means adapted to cooperate with said record to translate said recording into electrical impulses; an amplifier connected to said translating means; a relay connected to said amplifier and adapted to be operated by electrical impulses originated by said translating means and expressed to said relay via said amplifier; and recording means controlled by said relay whereby upon operation of said relay said recording means is operatively connected to said telephone line to record messages incoming thereover.

References Cited in the file of this patent

UNITED STATES PATENTS

| | | |
|---|---|---|
| 1,902,950 | Dally | Mar. 28, 1933 |
| 2,069,810 | Arnold | Feb. 9, 1937 |
| 2,080,812 | Fairbanks | May 18, 1937 |
| 2,116,314 | Jenkins et al. | May 3, 1938 |
| 2,171,366 | Hipple | Aug. 29, 1939 |
| 2,221,883 | Rowe | Nov. 19, 1940 |
| 2,336,777 | Clausen | Dec. 14, 1943 |
| 2,348,204 | Brubaker | May 9, 1944 |
| 2,373,676 | Germeshausen | Apr. 17, 1945 |
| 2,419,567 | Handschin | Aug. 22, 1950 |
| 2,419,568 | Handschin | Aug. 22, 1950 |
| 2,532,150 | De Boer | Nov. 28, 1950 |
| 2,533,234 | Edwards | Dec. 12, 1950 |
| 2,535,657 | Somers | Dec. 26, 1950 |
| 2,537,406 | Handschin et al. | Jan. 9, 1951 |
| 2,537,407 | Handschin et al. | Jan. 9, 1951 |
| 2,658,107 | Zimmermann | Nov. 3, 1953 |